Figure 1:
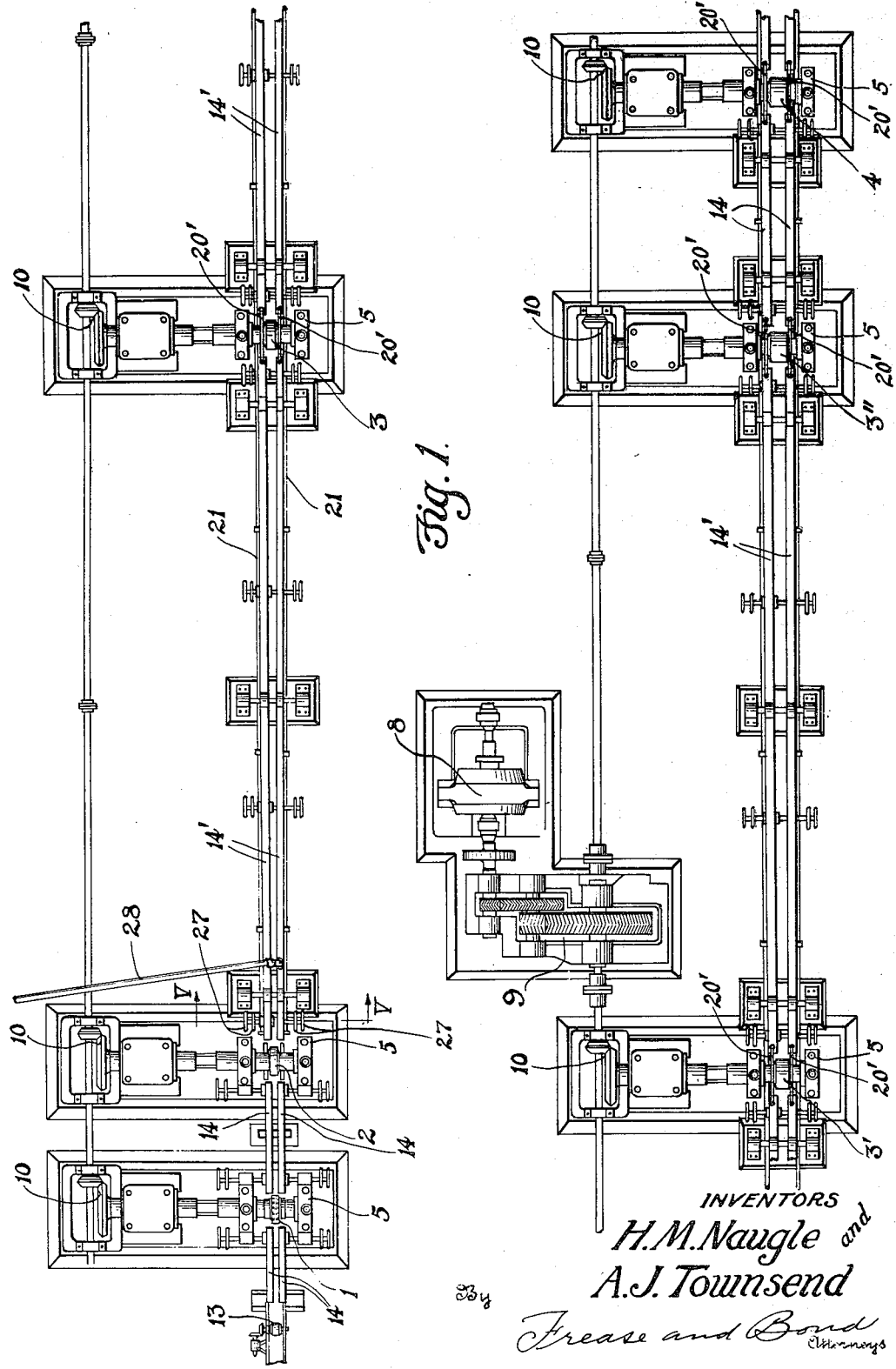

Oct. 30, 1923.  1,472,772
H. M. NAUGLE ET AL
STEEL JOIST MANUFACTURE
Filed July 22, 1921  9 Sheets-Sheet 1

INVENTORS
H. M. Naugle and
A. J. Townsend
By Frease and Bond
Attorneys

Oct. 30, 1923.

H. M. NAUGLE ET AL

STEEL JOIST MANUFACTURE

Filed July 22, 1921

1,472,772

9 Sheets-Sheet 2

Inventors
H. M. Naugle and
A. J. Townsend
By Frease and Bond
Attorneys

Oct. 30, 1923. 1,472,772
H. M. NAUGLE ET AL
STEEL JOIST MANUFACTURE
Filed July 22, 1921 9 Sheets-Sheet 3
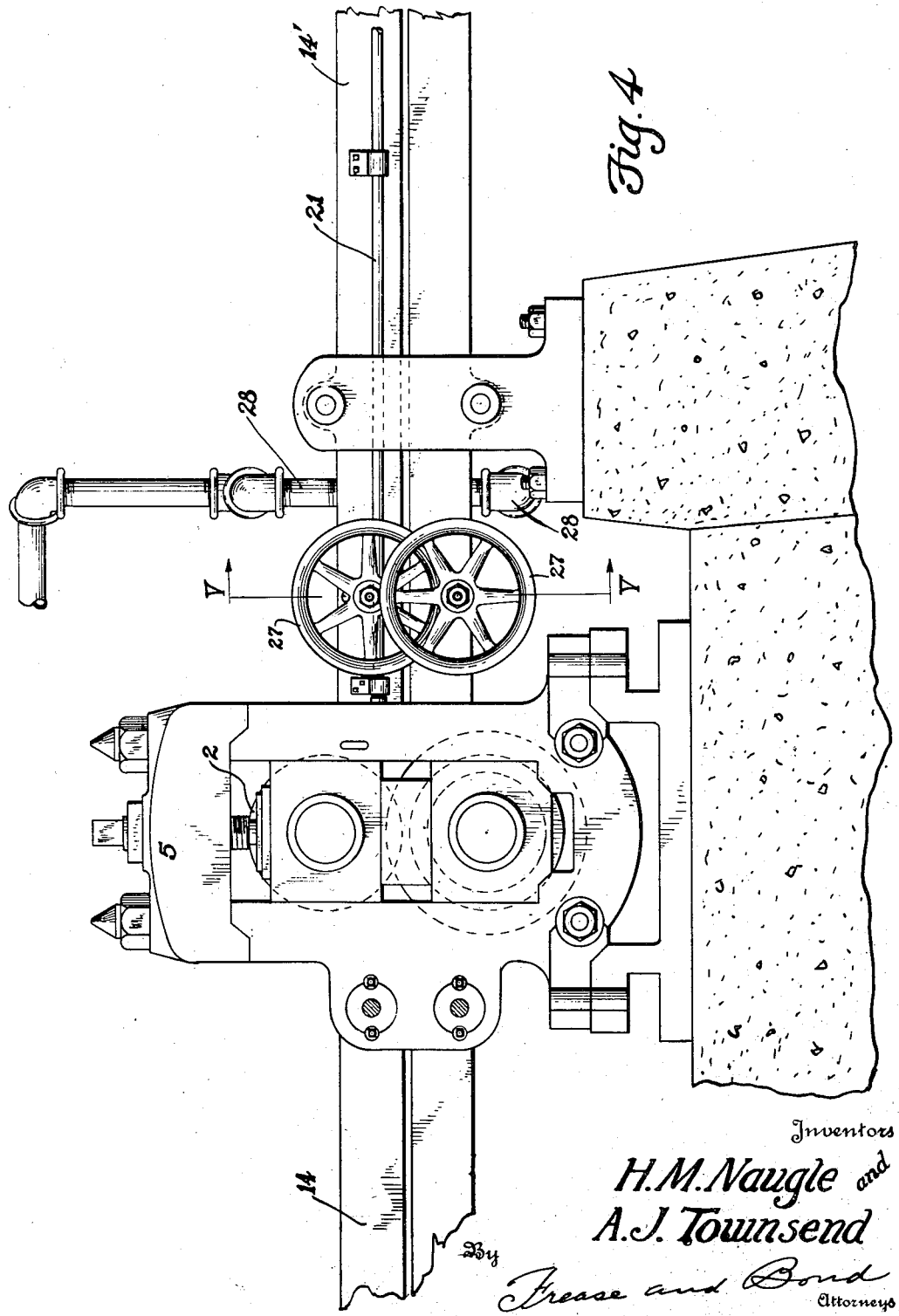

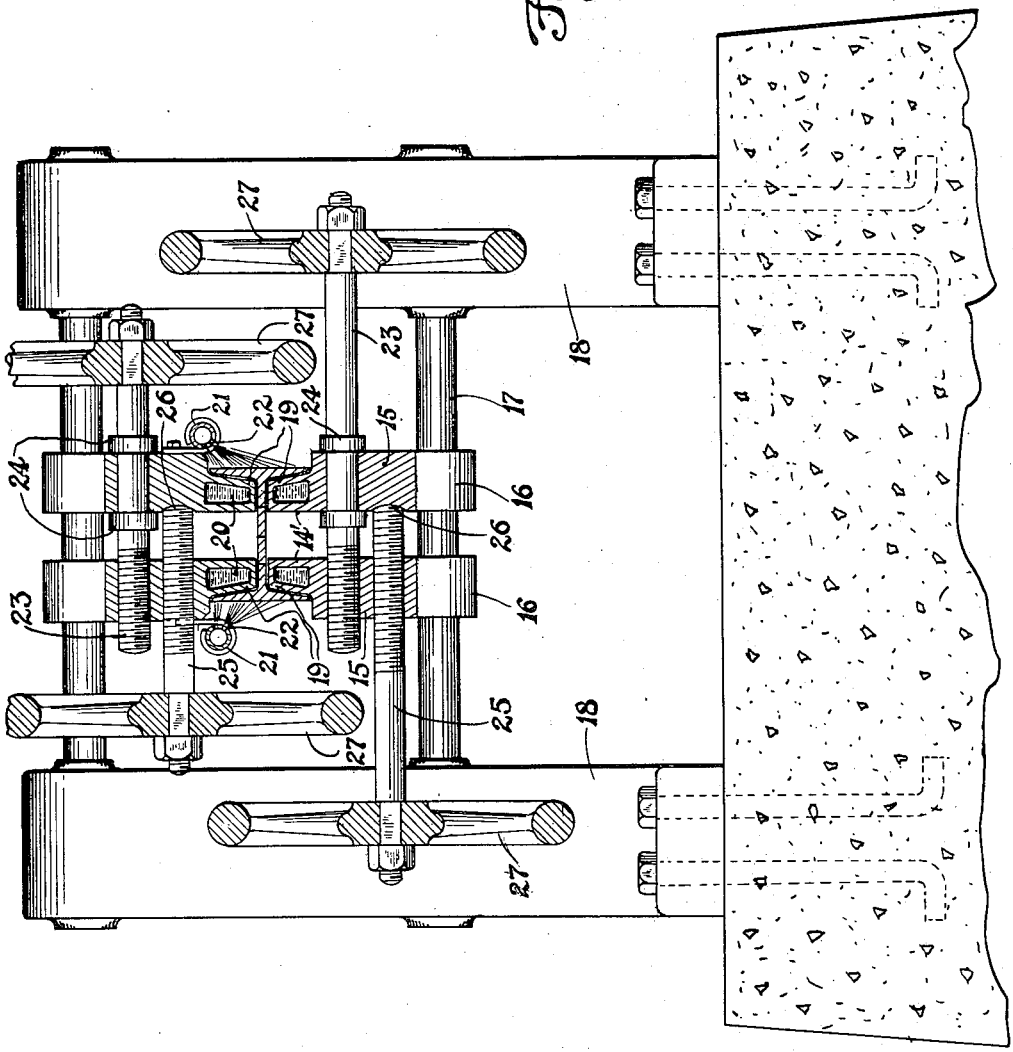

Oct. 30, 1923.   1,472,772
H. M. NAUGLE ET AL
STEEL JOIST MANUFACTURE
Filed July 22, 1921   9 Sheets-Sheet 5

Inventors
H. M. Naugle and
A. J. Townsend
By Frease and Bond
Attorneys

Oct. 30, 1923.

H M. NAUGLE ET AL

STEEL JOIST MANUFACTURE

Filed July 22, 1921

1,472,772

9 Sheets-Sheet 6

Inventors
H. M. Naugle and
A. J. Townsend
By Frease and Bond
Attorneys

Oct. 30, 1923.

H. M. NAUGLE ET AL 1,472,772

STEEL JOIST MANUFACTURE

Filed July 22, 1921  9 Sheets-Sheet 7

Inventors
H. M. Naugle and
A. J. Townsend
By Frease and Bond
Attorneys

Inventors
H.M.Naugle and
A.J.Townsend
By Frease and Bond
Attorneys

Patented Oct. 30, 1923.

1,472,772

UNITED STATES PATENT OFFICE.

HARRY M. NAUGLE AND ARTHUR J. TOWNSEND, OF CANTON, OHIO, ASSIGNORS, BY DIRECT AND MESNE ASSIGNMENTS, TO JONES AND LAUGHLIN STEEL COMPANY, OF PITTSBURGH, PENNSYLVANIA, A CORPORATION OF PENNSYLVANIA.

STEEL-JOIST MANUFACTURE.

Application filed July 22, 1921. Serial No. 486,880.

*To all whom it may concern:*

Be it known that we, HARRY M. NAUGLE and ARTHUR J. TOWNSEND, citizens of the United States, residing at Canton, in the county of Stark and State of Ohio, have invented a new and useful Improvement in Steel-Joist Manufacture, of which the following is a specification.

The invention relates to methods and apparatus for making steel joists and the like, for use in building construction in places where standard rolled structural shapes may not be used because of the excessive weight or improper distribution of the metal therein.

A standard rolled beam cannot be economically used as a floor joist or like member in building construction, because the limitations of rolling methods prevent the web portion being reduced to a thickness which would correspond in strength and rigidity to the resistance of the flange portions, so that there is an unnecessary weight of metal in the web.

Likewise, in the ordinary forms of steel joists, made of pressed channels with their webs abutted and secured together, the double thickness of the web portions gives an unnecessary weight of metal therein, as compared with the strength of the flange portions.

The present invention involves the expansion of the web portion of a rolled I-beam or other structural shape into an integral lattice portion; in such a manner that the strength of the lattice will be coordinated with that of the flanges without any excess metal being present in any portion of the beam.

The expansion of the web between the flanges of a rolled beam, necessarily requires an elongation of the bars of the lattice portion, because the flanges should not be contracted or distorted; but a stretching of the bars effected by a simultaneous separation of the flanges throughout their length, requires cumbersome apparatus for long lengths of beams, and has been limited in practice to an expansion comprising a single row of bars alternately inclined to form a series of triangles.

The object of the present improvement is to expand the web by slitting and stretching a plurality of rows of bars connected by bonds, and the formation of one or more rows of lattice openings; all by separating the flanges progressively during a continuous movement of the material, and without shortening or distorting the flanges of the beam.

The improvement contemplates the performance of the slitting, stretching and expanding operations with the web of a beam at a working heat, and preferably involves means for cooling the flanges to stiffen and prevent a distortion of the same during the bar stretching and lattice forming operations.

Other features of the improvement pertain to the design of the guides employed for separating the flanges and to the use of propelling rolls which intermittently flatten and true the bar during the stretching and lattice forming operations.

The accompanying drawings forming part hereof, illustrate the method and show apparatus for expanding the web of a rolled I-beam, by slitting two rows of bars and forming a single row of rectangular openings between two rows of triangular openings.

Figure 3:
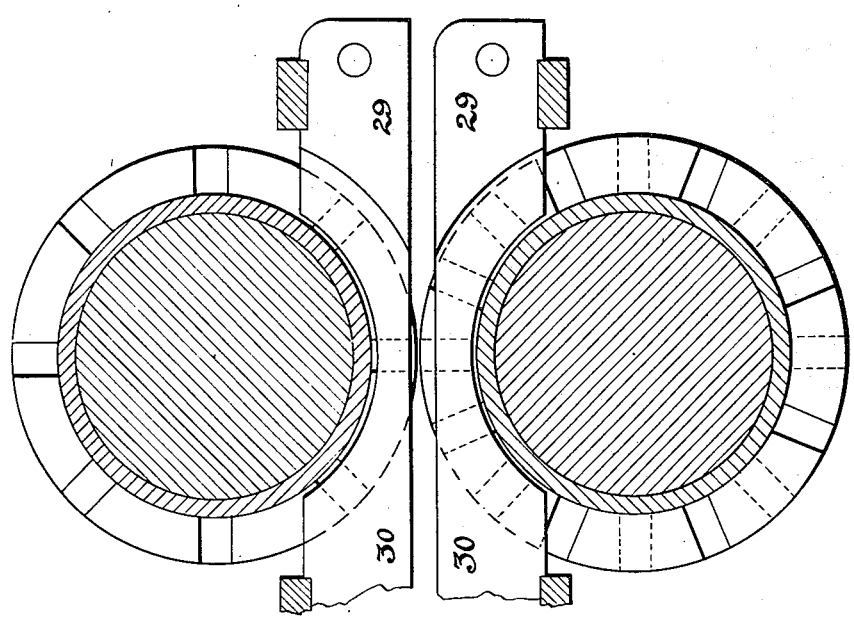
Figure 2:
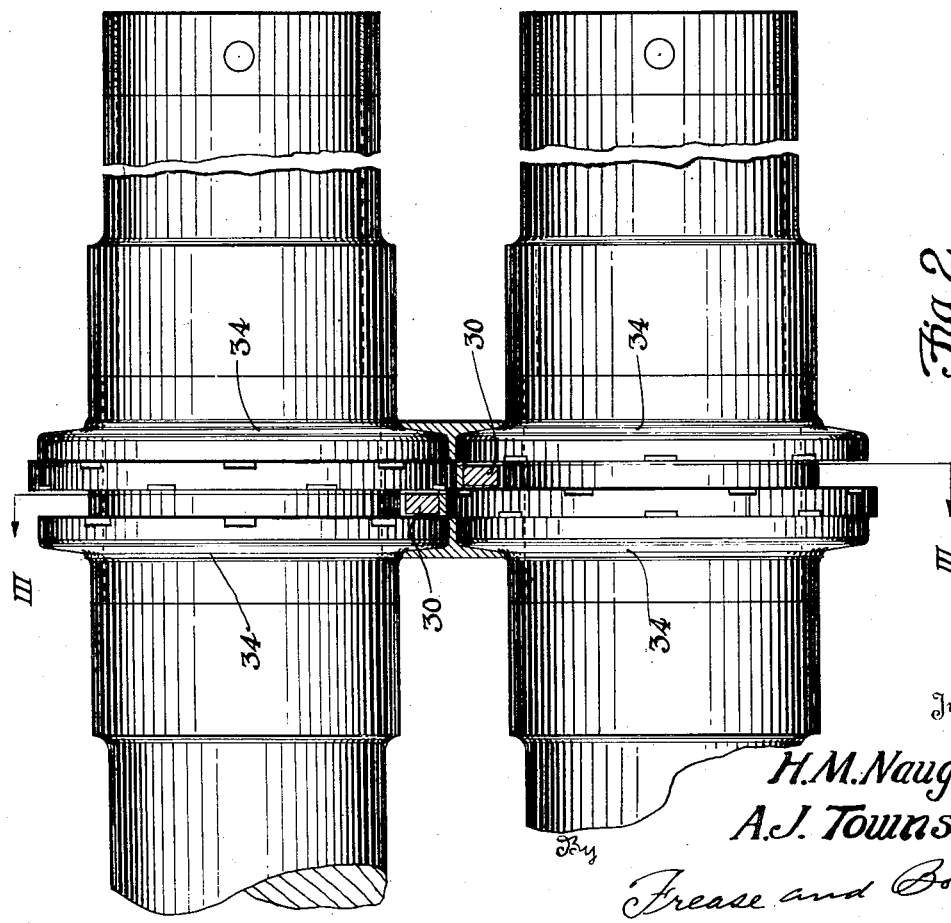
Figure 6:
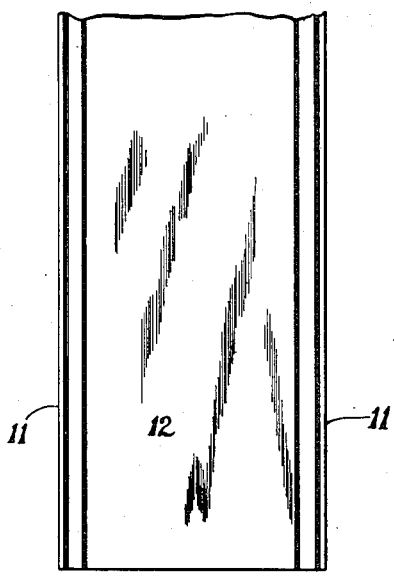
Figure 8:
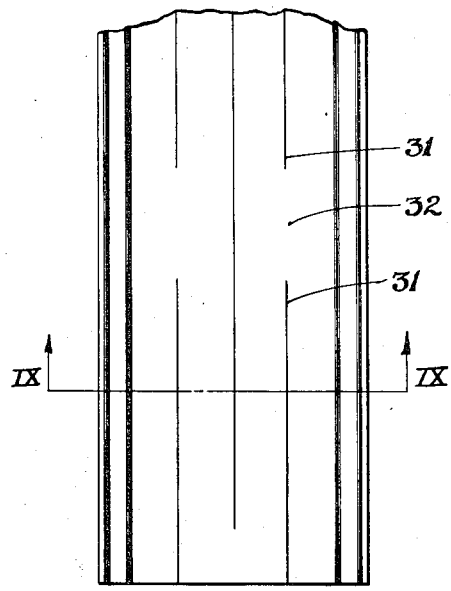
Figure 7:
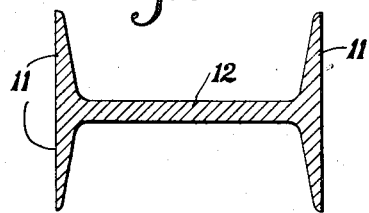
Figure 9:
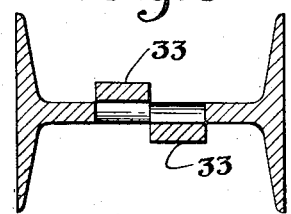
Figure 10:
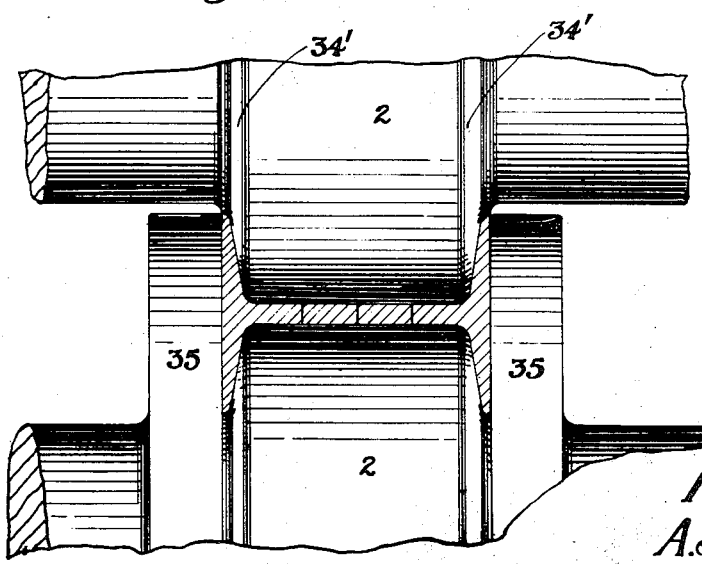
Figure 11:
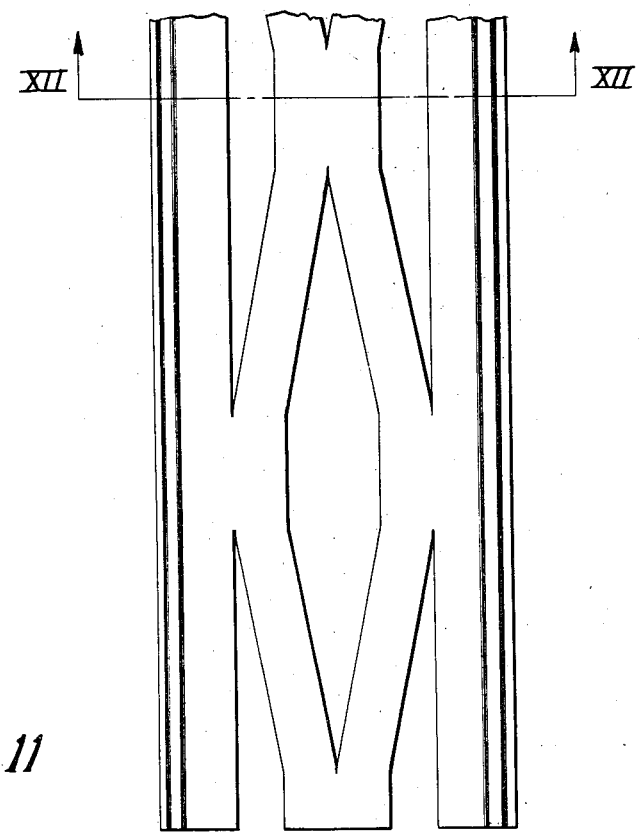
Figure 12:
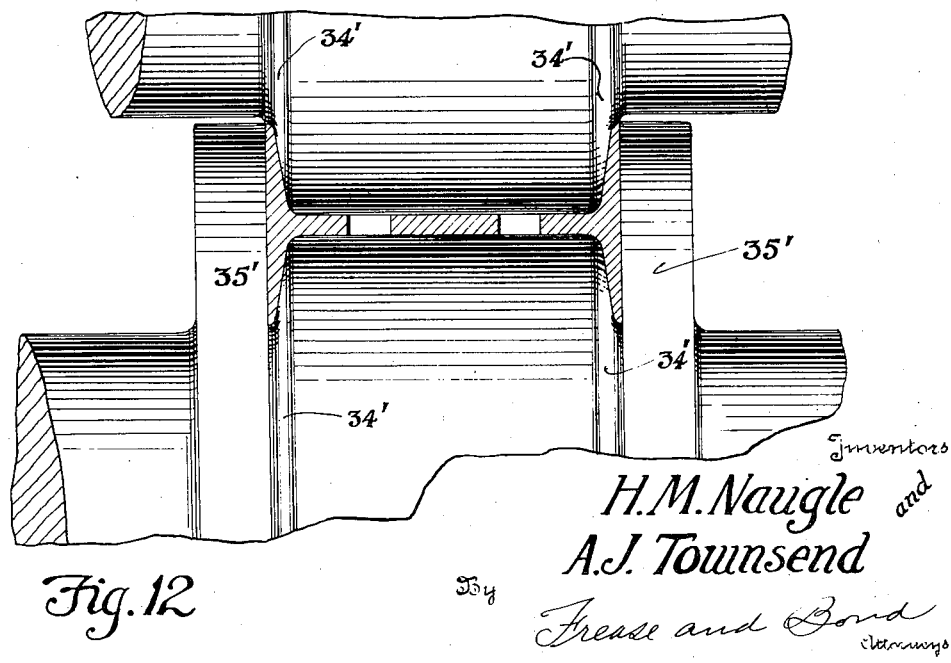
Figure 13:
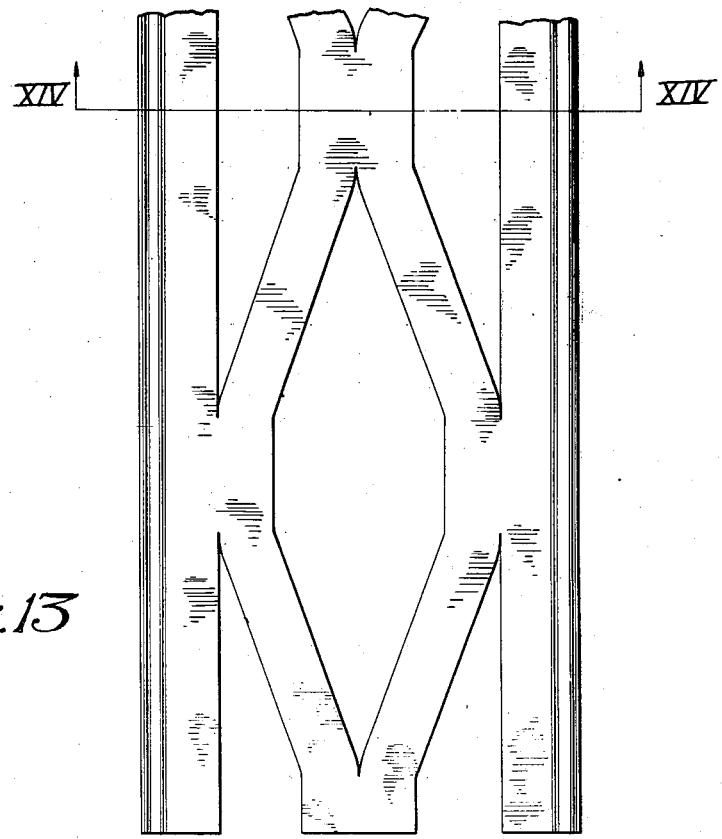
Figure 14:
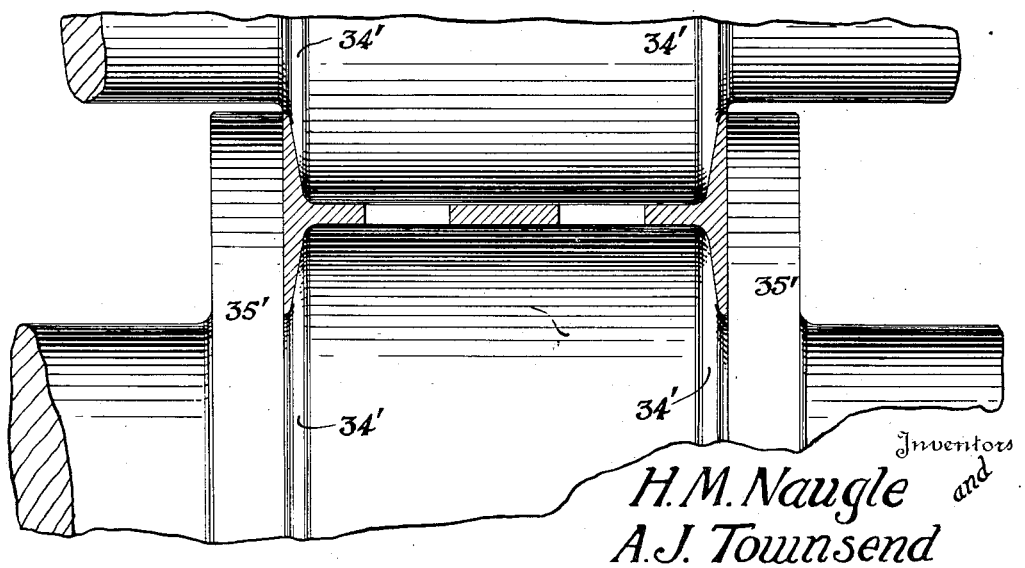
Figure 15:
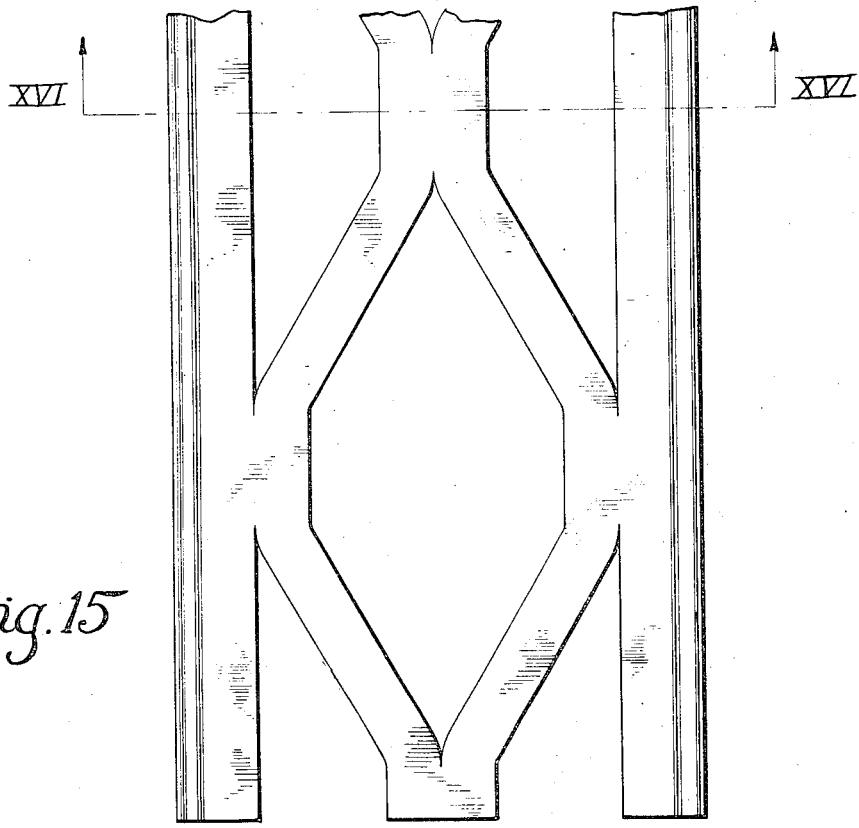
Figure 16:
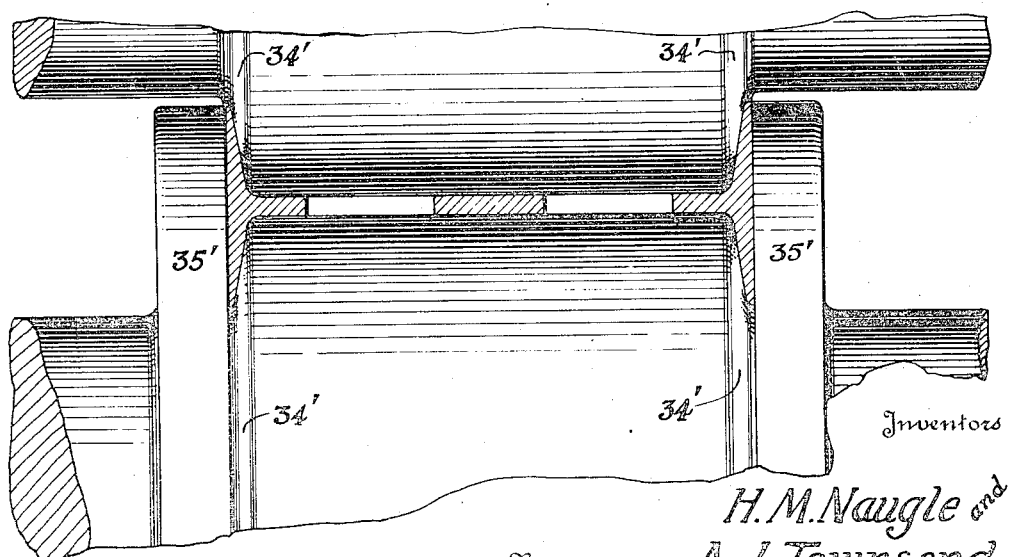
Figure 17:
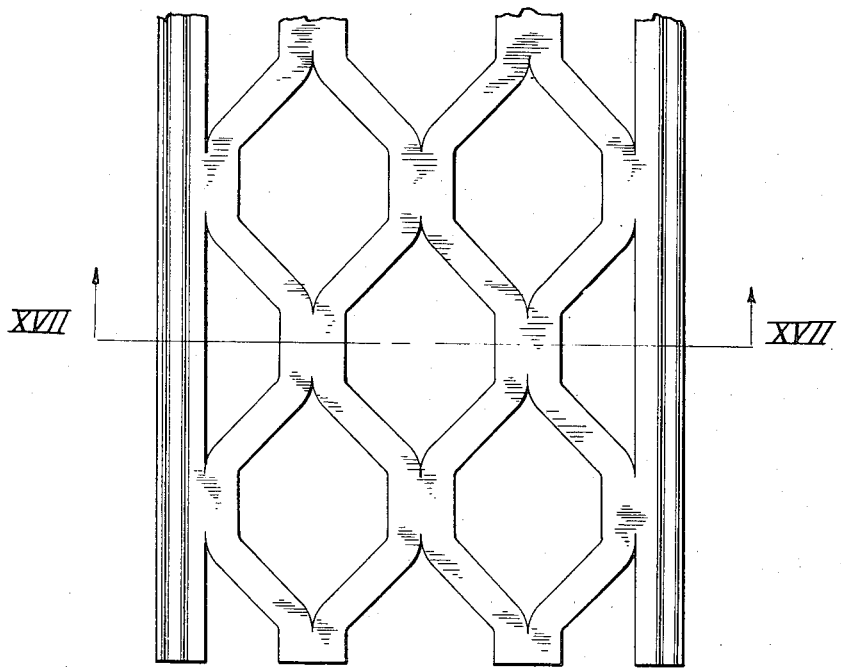
Figure 18:
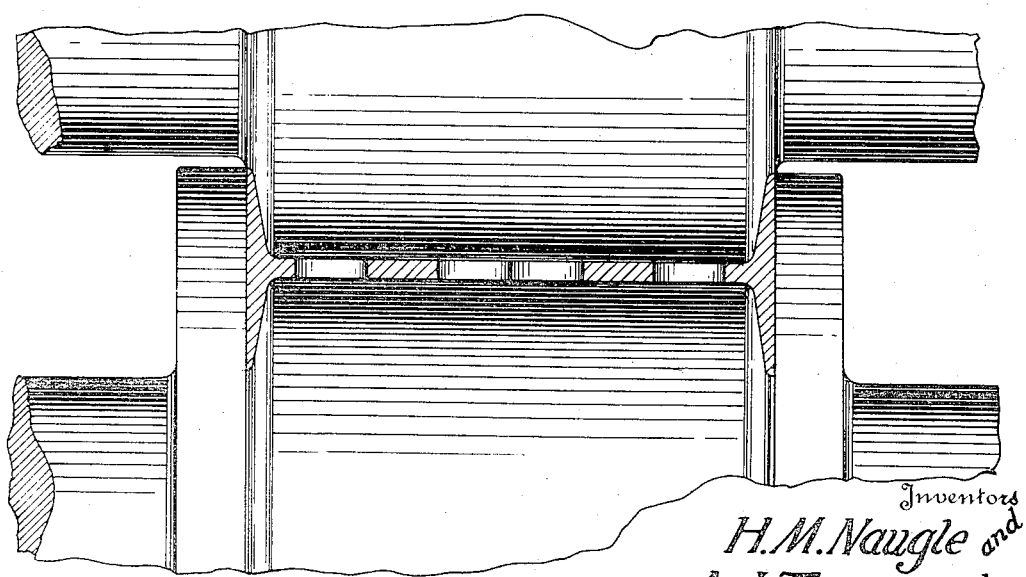

Referring to the drawings:

Figure 1 is a diagrammatic plan view, in two sections, of the apparatus;

Fig. 2, a fragmentary elevation of the slitting rolls, showing a slit beam in section;

Fig. 3, a section on line III—III, Fig. 2;

Fig. 4, a side elevation of the bar flattening rolls and the adjacent guides;

Fig. 5, a cross section of the flange guides on line V—V, Figs. 1 and 4;

Fig. 6, a fragmentary side plan of an I-beam;

Fig. 7, an end view of the same;

Fig. 8, a plan of same, showing the web slit to form bars;

Fig. 9, a cross section of same on line IX—IX, Fig. 8;

Fig. 10, a fragmentary elevation of the bar flattening rolls, showing a bar flattened beam in section;

Fig. 11, a fragmentary side plan of a beam, showing the initial formation of the lattice;

Fig. 12, a fragmentary elevation of the first lattice flattening rolls, showing a beam in section on line XII—XII, Fig. 11;

Fig. 13, a fragmentary side plan of the beam, showing a subsequent formation of the lattice;

Fig. 14, a fragmentary elevation of the second lattice flattening rolls, showing a beam in section on line XIV—XIV, Fig. 13;

Fig. 15, a fragmentary side plan of the beam, showing the final formation of the lattice;

Fig. 16, a fragmentary elevation of the final lattice flattening rolls, showing a beam in section on line XVI—XVI, Fig. 15;

Fig. 17, a fragmentary side plan of a beam showing the web slit and expanded to form four rows of lattice bars; and Fig. 18, a fragmentary elevation of final lattice flattening rolls, showing a beam in section on line XVII—XVII, Fig. 17.

Similar numerals refer to similar parts throughout the drawings.

The apparatus may include slitting rolls 1, bar flattening rolls 2, lattice flattening rolls 3, 3′ and 3″, and delivery rolls 4; all of which may be mounted in suitable housings 5 and arranged to be continuously driven at the proper speed by a motor 8, and gearings 9 and 10.

The beam blank shown in Figs. 6 and 7, may have flanges 11 rolled with the web 12, which web may be and preferably is somewhat thicker than in a standard structural shape. The beam may be received directly from the table rolls 13 of a rolling mill, at a working temperature of say 1500° F.; and a cold beam may be reheated to a working temperature, or light sections may be worked cold.

Parallel guides 14 may engage the flanges 11 of the beam for properly directing it to the slitting rolls, and like parallel guides 14 for engaging and directing the flanges, extend from the slitting roll 1 to the bar flattening rolls 2. Diverging guides 14′ extend from the bar flattening rolls 2, to the first lattice flattening rolls 3, also from the first to the second lattice flattening rolls 3′ and also from the second to the final flattening rolls 3″; and parallel guides 14 extend from the final lattice flattening rolls to the delivery rolls 4, and also from the latter rolls to carry the finished beam to the place of delivery.

As shown in Fig. 5, the guides 14 and 14′, may each comprise a body portion 15 having bearings thereon slidably mounted on the transverse bars 17 extending between supporting standards 18; and the body of each guide preferably abuts the edge of a beam flange, and is provided with a guide flange fitting against the inner face of the beam flange and also fitting against an adjacent portion of the web of the beam.

The guide flanges are preferably made hollow to form a duct 20, for carrying cooling water; and the guides may also carry pipes 21 with ports 22 therein, for conveying and spraying water against the outer faces or bases of the beam flanges.

Means for adjusting and locking the guides at spaced intervals apart, may comprise adjusting screws 23 turning in one guide and having collars 24 abutting the sides of the opposing guide; and locking screws 25 turning through the one guide, with their ends 26 abutting the other guide; each screw being provided with a hand wheel 27, for manual operation.

Cool water may be received through supply pipes 28 entering the ducts in the several guide bars immediately in rear of the bar flattening rolls, as shown in Fig. 4; whence the water moves rearward through the ducts, passing from one guide to another, through pipes 20′ bowed around the lattice flattening rolls; and at the end of the inclined guides, the ducts may communicate with the rear ends of the cooling pipes 21; whence the water moves forward through the same and may be discharged through the apertures 22 therein against the outer faces of the beam flanges during the operation of the machine.

The slitting rolls 1 may be of any well known type, and as shown, are provided with stripper plates 29 mounted between spacer plates 30. These rolls cut the web with series of laterally spaced longitudinal slits 31, interrupted to form intervening bonds 32. The slitting operation displaces the bars 33 formed thereby, to one side or the other of the original plane of the web, as shown in Fig. 9. The slitting rolls may be formed with inclined ends 34 shaped so as to bear and operate against the inner inclined faces of the beam flanges, to preserve the true shape thereof.

The beam is guided to and from the slitting rolls by an engagement of its flanges by the parallel guides 14; and the operation of the slitting rolls drives the beam forward to the bar flattening rolls 2, which are likewise provided with inclined ends 34′ shaped to bear and operate against the inner faces of the beam flanges. One of the rolls may be provided with end flanges 35, bearing against the outer faces of the beam flanges, so as to positively control and guide the same through the machine. The cylindric faces of the bar flattening rolls 2 compress and flatten the slitted portion of the web into the original plane thereof, as shown in Fig. 10.

The bar flattening rolls 2 drive the beam forward, and its flanges are engaged by the flanges 19 of the first set of diverging guides 14′ which are positioned by adjustment to gradually separate the beam flanges as the beam moves through the machine. In this operation, the bars 33 are laterally inclined and longitudinally stretched by the lateral separation of the bonds 32, into the initial lattice formation shown in Fig. 11. As the beam passes through the first lattice flattening rolls 3, any deflection of the bars or bonds which may have been caused by the expanding action of the diverging guides, will be smoothed and flattened into the original plane of the web by the compressing action of the cylindric faces of these rolls.

The direct and indirect cooling of the beam flanges by the water passing through the guide ducts and discharging from the apertured pipes, acts to chill the beam flanges and serves to harden and stiffen the same during the operation of stretching the bars and deploying the bonds of the web, thereby supplementing the action of the guides in maintaining the beam flanges in true formation and alinement.

The operation of the lattice flattening rolls 3, 3' and 3'', acts to propel the beam forward through each successive set of guide bars; and the action of each set of diverging guides 14' further separates the beam flanges and further expands the web thereof by a stretching of the bars and a deployment of the bonds, into the secondary formation illustrated in Fig. 13, and the final formation shown in Fig. 15. Each successive set of rolls compresses and flattens the bars and bonds into the original plane of the web, to form the finished product shown in Fig. 15.

It is preferred to provide a set of parallel guides 14 in rear of the third lattice flattening rolls 3'', and also to provide delivery rolls 4 in rear of these guides, so as to positively convey and deliver the web expanded beam from the rear end of the machine.

All the lattice flattening rolls and the delivery rolls may be provided with inclined ends 34' and one roll of each set with a flange 35', for operating against the inner and outer faces of the beam flanges, to maintain the same in true shape and alinement as the web is expanded and the beam is conveyed through the machine; so that the beam is delivered therefrom with a flat lattice web, and straight and normal flanges.

It is evident that by merely increasing the number of rows of slits and bonds and suitably shaping the flattening and conveyer rolls and adjusting the parallel and diverging guides, the web portions of structural shapes of various kinds and dimensions can be expanded by the described method and apparatus to form a plurality of rows of lattice openings, as for instance, three longitudinal rows of full openings with two marginal rows of half openings, as shown in Figs. 17 and 18.

We claim:—

1. The method of expanding the web of a flanged structural shape or the like, which consists in slitting the web to form bars, and separating the flanges progressively from end to end to longitudinally stretch and laterally incline the bars.

2. The method of expanding the web of a flanged structural shape or the like, which consists in slitting the web to form bars, flattening the same and separating the flanges progressively from end to end to longitudinally stretch and laterally incline the bars.

3. The method of expanding the web of a flanged structural shape or the like, which consists in heating the metal to a working temperature, slitting the web to form bars, and separating the flanges progressively from end to end to longitudinally stretch and laterally incline the bars.

4. The method of expanding the web of a flanged structural shape or the like, which consists in heating the metal to a working temperature, slitting the web to form bars, longitudinally stretching and laterally inclining the bars, and contemporaneously cooling the flanges.

5. The method of expanding the web of a flanged structural shape or the like, which consists in heating the metal to a working temperature, slitting the web to form bars, separating the flanges to longitudinally stretch and laterally incline the bars, and contemporaneously cooling the flanges.

6. The method of expanding the web of a flanged structural shape or the like, which consists in heating the metal to a working temperature, slitting the web to form bars, separating the flanges progressively from end to end to longitudinally stretch and laterally incline the bars, and contemporaneously cooling the flanges.

7. The method of expanding the web of a flanged structural shape or the like, which consists in slitting the web to form bars, separating the flanges progressively from end to end, to longitudinally stretch and laterally incline the bars, and intermittently flattening the web.

8. The method of expanding the web of a flanged structural shape or the like, which consists in slitting the web to form bars, separating the flanges progressively from end to end, to longitudinally stretch and laterally incline the bars, and intermittently flattening the web and truing the flanges.

9. Apparatus for expanding the web of a flanged structural shape or the like, including means slitting the web to form bars and means separating the flanges progressively from end to end to longitudinally stretch and laterally incline the bars.

10. Apparatus for expanding the web of a flanged structural shape or the like, including means slitting the web to form bars, means flattening the same, and means separating the flanges progressively from end to end to longitudinally stretch and laterally incline the bars.

11. Apparatus for expanding the web of a flanged structural shape or the like, including means slitting the web to form bars, means separating the flanges progressively from end to end to longitudinally stretch and laterally incline the bars, and intermittent means flattening the bars into the plane of the web.

12. Apparatus for expanding the web of a beam having side flanges, including roller means slitting the web to form bars, and guide means separating the flanges progressively from end to end to longitudinally stretch and laterally incline the bars.

13. Apparatus for expanding the web of a beam having side flanges, including roller means slitting the web to form bars, roller means flattening the same, and guide means separating the flanges progressively from end to end to longitudinally stretch the bars, and laterally incline the bars.

14. Apparatus for expanding the web of a beam having side flanges, including roller means slitting the web to form bars and bonds, guide means separating the flanges progressively from end to end to longitudinally stretch the bars, and laterally incline the bars, and intermittent roller means flattening the bars into the plane of the web.

15. Apparatus for expanding the web of a beam having side flanges, including means heating the beam to a working temperature, means slitting the web to form bars, means longitudinally stretching and laterally inclining the bars, and means contemporaneously cooling the flanges.

16. Apparatus for expanding the web of a beam having side flanges, including means heating the beam to a working temperature, means slitting the web to form bars, means separating the flanges to longitudinally stretch and laterally incline the bars, and means contemporaneously cooling the flanges.

17. Apparatus for expanding the web of a beam having side flanges, including means heating the beam to a working temperature, means slitting the web to form bars, means separating the flanges to longitudinally stretch and laterally incline the bars progressively from end to end, and means contemporaneously cooling the flanges.

18. Apparatus for expanding the web of a beam having side flanges with its web slit to form bars and being heated to a working temperature, including means for separating the flanges to longitudinally stretch and laterally incline the bars, and means contemporaneously cooling the flanges.

19. The method of expanding the web of a beam having side flanges with the web slit to form bars and being heated to a working temperature, which consists in separating the flanges to longitudinally stretch and laterally incline the bars, and contemporaneously cooling the flanges.

20. The method of expanding the web of a flanged structural shape or the like, which consists in slitting the web to form bars, then flattening the same, and then simultaneously stretching the bars longitudinally, and inclining them laterally progressively from end to end.

21. The method of expanding the web of a flanged structural shape or the like, which consists in slitting the web to form bars, then flattening the same, and then simultaneously stretching the bars longitudinally and inclining them laterally.

HARRY M. NAUGLE.
ARTHUR J TOWNSEND.